July 27, 1965 P. P. LODA 3,196,507

COMBINATION MONEY CLIP IMPLEMENT

Filed April 13, 1964

INVENTOR.
PAUL P. LODA

BY

*Peter L. Costas*

ATTORNEY 3,196,507
COMBINATION MONEY CLIP IMPLEMENT
Paul P. Loda, Ansonia, Conn., assignor to The Britton Corporation, Newington, Conn., a corporation of Connecticut
Filed Apr. 13, 1964, Ser. No. 359,182
10 Claims. (Cl. 24—3)

The present invention relates to money clips and, more specifically, to a combination money clip and accessory implement.

It is the aim of the present invention to provide a novel combination money clip and accessory implement which will easily receive money and yet hold it securely and which may be fabricated and assembled relatively easily and economically.

A specific aim is to provide such a combination money clip element which will receive and retain an accessory implement blade in a position protecting the user and his clothing from inadvertent injury.

Other aims and advantages will be apparent from the following detailed specification and claims and the attached drawing wherein:

Figure 1:
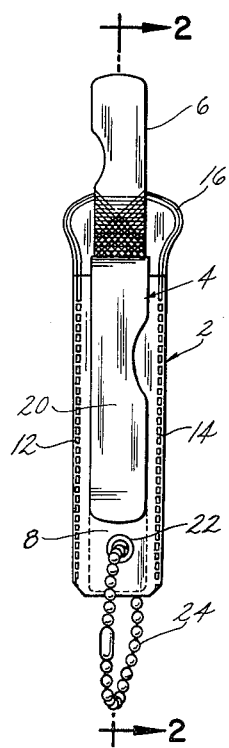
FIGURE 1 is a front elevational view of a combination money clip implement embodying the present invention with an accessory nail file partially withdrawn from the sheath.

It has now been found that the foregoing and related objects may be readily attained in a combination money clip having in assembled relationship an elongated sheath member and a clip member and accessory implement which are partially received within the sheath member. The sheath member is of flexible sheet material and has front and rear wall portions in generally overlying relationship which are joined to each other adjacent and along the longitudinal margins thereof. Received and secured within the sheath member between the front and rear wall portions thereof is one of two generally parallel extending leg portions of a money clip member, which leg portions are connected at one end and biased toward each other at the other end by the inherent resiliency of the material of the clip member. The front wall portion of the sheath member is thus interposed between the two leg portions of the clip member, and the leg portion within the sheath imparts rigidity thereto. The other or exterior leg portion is biased tightly against the one leg portion through the thickness of the material of the front wall portion for relatively slip-resistant gripping of money therebetween. An elongated implement blade such as a fingernail file is slidably received between the one leg portion and the rear wall portion of the sheath member and the sheath member and implement are cooperatively dimensioned so that one end of the implement extends outwardly from the sheath member for convenient gripping by a user. The sheath member and the interior leg portion are configured and dimensioned to receive the implement snugly therebetween and to restrain frictionally the implement from inadvertent sliding outwardly from the sheath member.

To prevent inadvertent separation of the clip and sheath members during the tugging forces attendant to inserting and removing money, the sheath member and the one leg portion may be cooperatively configured and dimensioned to secure the one leg portion in the sheath member by frictional engagement such as by stretching the sheath member over the one leg portion or by configuring the two so as to be of larger transverse dimension adjacent the far end of the leg portion and securing the longitudinal margins to each other in assembled position. Alternatively, the leg portion may have a recess or aperture or other openings therein with portions of the sheath member on both sides of the leg portion joined together through the opening to secure the leg portion. This joining may be accomplished with a suitable adhesive or by heat sealing where applicable. As a further alternative, a fastener may extend through generally aligned apertures in the front and rear wall portions and the one leg portion to secure the leg portion within the sheath member. This fastener may have headed portions at either end outwardly of the wall portions and a hollow shank for receiving a key chain, thereby further increasing the versatility of the device.

The sheath member may include an internal partition wall portion interposed between the one leg portion and the implement to minimize abrading contact therebetween. The partition wall portion may extend over the full length of the one leg portion or it may cover only the areas of the leg portion most likely to be in abrading contact with the implement such as the portion thereof adjacent the point of entry of the implement.

The material of the sheath member should be relatively abrasion-resistant and should desirably provide greater frictional resistance to movement thereagainst than the material of the money clip. The surface of the material of the sheath member may be embossed to simulate the appearance of leather and to enhance its frictional properties. Moreover, the material may be deformed under the pressure of the exterior leg which will form a slight indentation therein and money clamped between the exterior leg and the sheath member will tend to be pressed into this indentation by the leg portion, thus enhancing the slip-resistant grip upon the money.

The material of the sheath member thus may cooperate with the clip member to improve greatly its clamping qualities and the clip member, in turn, cooperates with the sheath member by providing rigidity thereto for service as a sheath for an accessory implement blade.

Figure 2:
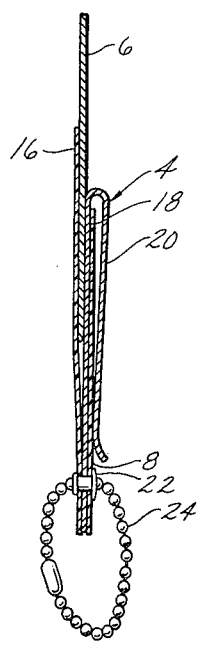
FIGURE 2 is a sectional view along the line 2—2 of FIGURE 1.

Turning now in detail to the attached drawings, FIGURES 1 and 2 illustrate a combination money clip embodying the present invention and including a sheath member generally designated by the numeral 2, a clip member generally designated by the numeral 4 and integrally formed from resiliently deflectable material such as spring steel, and an accessory implement 6, illustrated herein as a nail file.

The sheath member 2 is conveniently formed of flexible synthetic plastic sheet material such as polyvinyl chloride and vinyl chloride-acetate copolymer and has a front wall portion 8 and a rear wall portion 10 in generally overlying relationship and joined to each other along their longitudinal margins along heat seal lines 12, 14 which simulate stitching. The rear wall portion 10, is of greater longitudinal dimension to provide a tab portion 16 projecting from one end thereof for convenient gripping and for overlying the outer or free end of the implement 6 in the position of assembly (not shown) with the implement fully inserted.

The front wall portion 8 of the sheath member 2 is interposed between the two generally parallel extending leg portions 18, 20 of the clip member 4, with the leg portion 18 being received within the sheath member 2 and the leg portion 20 being biased against the leg portion 18 through the material of front wall portion 8. The leg portion 18 extends substantially along the length of front wall portion 8 to impart rigidity to the sheath member 2 along the length of the front wall portion 8 and is secured within the sheath member 2 by a fastener such as the hollow rivet 22 which extends through generally aligned apertures in the leg portion 18 and front and rear wall portions 8, 10. In this manner, the key chain 24 may extend through the hollow shank of the rivet 22.

The rigidified sheath member 2 provides an excellent sheath for a generally flat accessory implement such as the nail file 6 which is snugly and slidably received between the rear wall portion 10 and the leg portion 18 and restrained frictionally from inadvertent movement outwardly from the sheath member. The nail file 6 is so dimensioned that when the inner or pointed end is in abutting contact with the rivet 22, the other or outer end portion thereof projects outwardly of the pocket portion of sheath member 2 for convenient grasping for removal although it is still overlain by the tab portion 16 of the rear wall portion 10.

Figure 3:
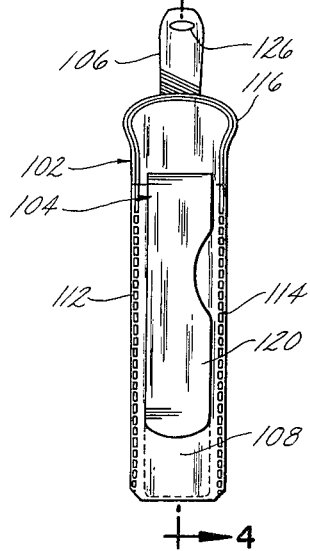
FIGURE 3 is a front elevational view of another embodiment of the combination money clip implement with an accessory nail file similarly withdrawn from the sheath.
Figure 4:
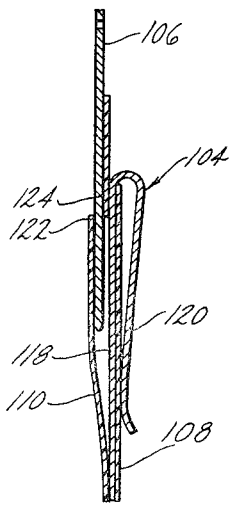
FIGURE 4 is a sectional view along the line 4—4 of FIGURE 3.

Turning now to FIGURES 3 and 4 and the modified embodiment of the combination money clip shown therein, the sheath member generally designated by the numeral 102 is in assembled relationship with the clip member generally designated by the numeral 104 and a nail file 106. The front and real wall portions 108, 110 of the sheath member 102 are secured to each other in overlying relationship along the heat seal lines 112, 114 and the tab portion 116 projects from one end of rear wall portion 110 for convenient gripping.

The front wall portion 108 is interposed between the leg portions 118, 120 of the clip member 104, and the leg portion 118 is snugly received between heat seal lines 112, 114 to secure the leg portion 118 within the sheath member 102 by frictional engagement. The real wall portion 110 has a generally transversely extending slit 122 therein spaced inwardly from the tab portion 116 thereof through which the file 106 may be conveniently passed during insertion or removal from the sheath member 102 as best seen in FIGURE 4. The portion 124 of the rear wall portion 110 adjacent the tab side of the slit 122 extends between the file 106 and the attached end of the leg portion 118 to minimize abrading contact there-between during insertion and removal of the file 106.

The nail file 106 is so dimensioned that, when inserted in the sheath member 102 with the pointed end adjacent the free end of the leg portion 118, the other end thereof extends through slit 122 outwardly of sheath member 102, and the aperture 126 is exposed for engagement by a finger nail for removal from the sheath member, although still overlain by the tab portion 116.

Thus it can be seen that the present invention provides a novel and highly useful combination money clip implement wherein the elements cooperate in a novel way to provide extremely effective gripping of money and a convenient rigid sheath for frictionally holding the accessory implement. The structure is relatively simple and may be relatively easily and economically fabricated and assembled.

Having thus described my invention, I claim:

1. A combination money clip comprising an elongated sheath member of flexible sheet material, said sheath member having front and rear wall portions in generally overlying relationship and joined to each other adjacent the longitudinal margins thereof to provide a pocket therebetween; a clip member with two generally parallel extending leg portions connected at one end and having their other ends biased toward each other, the front wall portion of said sheath member being interposed between said two leg portions, one of said leg portions thereby being received within said sheath member between said front and rear wall portions thereof, said one leg portion being dimensioned cooperatively and snugly fitting within said pocket for imparting rigidity thereto, the other leg portion being biased tightly against said one leg portion through the thickness of the material of said front wall portion to provide relatively slip resistant gripping of associated money received between said other leg portion and said front wall portion, said one leg portion of said clip member being secured within said pocket of said sheath member; and an elongated implement slidably received in said pocket between said one leg portion and said rear wall portion of said sheath member, said sheath member and implement being cooperatively dimensioned with one end portion of said implement extending outwardly from said pocket of said sheath member for convenient gripping by a user, said sheath member and said one leg portion being configured and dimensioned to receive said implement snugly therebetween and to restrain frictionally said implement from inadvertently sliding outwardly from said sheath member, said rear wall portion of said sheath member extending to the outer end of said one end portion of said implement and providing a tab portion overlying said one end portion.

2. The money clip of claim 1 wherein said sheath member and said one leg portion are cooperatively configured and dimensioned to secure said one leg portion within said sheath member by frictional engagement.

3. The money clip of claim 1 wherein said one leg portion has an opening therein and portions of said sheath member on both sides of said one leg portion are joined together through said opening to secure said one leg portion within said sheath member.

4. The money clip of claim 1 wherein said one leg portion and said front and rear wall portions have generally aligned apertures therein and wherein a locking member extends through said apertures to lock said sheath and clip members together.

5. The money clip of claim 4 wherein said locking means is a hollow fastener with head portions at either end outwardly of said front and rear wall portions of said sheath and a chain extending through said hollow fastener.

6. The money clip of claim 1 wherein said sheath member includes an internal partition wall portion interposed between said one leg portion and said implement to minimize abrading contact therebetween.

7. A combination money clip comprising an elongated sheath member of flexible, synthetic plastic sheet material, said sheath member having front and rear wall portions in generally overlying relationship and joined to each other adjacent the longitudinal margins thereof to provide a pocket therebetween; said rear wall portion having a tab portion extending from one end thereof beyond said front wall portion, an integrally formed clip member of resiliently deflectable material having two generally parallel extending leg portions connected at one end and having their other ends biased toward each other by the inherent resiliency of the material of said clip member, the front wall portion of said sheath member being interposed between said two leg portions, one of said leg portions thereby being received within said sheath member in said pocket between said front and rear wall portions thereof, said one leg portion being dimensioned cooperatively and extending snugly within said pocket substantially along the length of said front wall portion to impart rigidity to said sheath member substantially along he length of said front wall portion, the other leg portion being biased tightly against said one leg portion through the thickness of the material of said front wall portion to provide relatively slip-resistant gripping of associated money received between said other leg portion and said front wall portion; means securing said one leg portion of said clip member within said sheath member; and an elongated, generally flat implement slidably received in said pocket between said one leg portion and said rear wall portion of said sheath member, said sheath member and implement being cooperatively dimensioned with one end portion of said implement extending outwardly from said pocket of said sheath member for convenient gripping by a user, said sheath member and said one leg portion being configured and dimensioned to receive said implement snugly therebetween and to restrain frictionally implement from inadvertently sliding outwardly from said sheath member, said tap portion of said sheath member extending to the outer end of and overlying said one end portion of said implement.

8. The money clip of claim 7 wherein said implement slides into said sheath portion forwardly of said tab portion.

9. The money clip of claim 7 where said one leg and said front and rear wall portions have generally aligned apertures therein and wherein said securing means is a hollow fastener with head portions at either end outwardly of said front and rear wall portion of said sheath and a chain extends through said hollow fastener.

10. A combination money clip comprising an elongated sheath member of flexible, synthetic plastic sheet material, said sheath member having front and rear wall portions in generally overlying relationship and joined to each other adjacent the longitudinal margins thereof to provide a pocket therebetween, said rear wall portion having a tab portion extending from one end thereof beyond said front wall portion, said rear wall portion having a generally transversely extending slit therein spaced inwardly from the tap portion thereof; an integrally formed clip member of resiliently deflectable material having two generally parallel extending leg portions connected at one end and having their other ends biased toward each other by the inherent resiliency of the material of said clip member, the front wall portion of said sheath member being interposed between said two leg portions, one of said leg portions thereby being received within said sheath member in said pocket between said front and rear wall portions thereof, said one leg portion being dimensioned cooperatively and extending snugly within said pocket substantially along the length of said front wall portion to impart rigidity to said sheath member substantially along the length of said front wall portion, the other leg portion being biased tightly against said one leg portion through the thickness of the material of said front wall portion to provide relatively slip-resistant gripping of associated money received between said other leg portion and said front wall portion, means securing said one leg portion of said clip member within said sheath member; and an elongated, generally flat implement extending through said slit in said rear wall portion and slidably received in said pocket between said one leg portion and said rear wall portion of said sheath member, said sheath member and implement being cooperatively dimensioned with one end portion of said implement extending outwardly from said pocket of said sheath member rearwardly of said tab portion for convenient gripping by a user, said sheath member and said one leg portion being configured and dimensioned to receive said implement snugly therebetween and to restrain frictionally said implement from inadvertently sliding outwardly from said sheath member, the portion of said rear wall portion adjacent the tab side of said slit extending between said implement and said clip member to minimize abrading contact therebetween, said tab portion of said sheath member extending to the outer end of and overlying said one end portion of said implement.

References Cited by the Examiner

UNITED STATES PATENTS

| 1,372,959 | 3/21 | Klenck | 24—3 |
| 1,555,714 | 9/25 | Kahn | 24—3 |
| 1,693,006 | 11/28 | Thomas | 150—40 |
| 1,713,760 | 5/29 | Kuester | 24—3 |
| 2,126,826 | 8/38 | Shively | 24—3 |
| 2,357,919 | 9/44 | Weiss | 24—49 X |
| 2,553,904 | 5/51 | Eslick. | |
| 2,748,821 | 6/56 | Hutchinson | 150—39 |
| 2,758,798 | 8/56 | Schmidt | 224—26.1 |
| 2,828,975 | 4/58 | Wright | 150—39 X |

FOREIGN PATENTS 399,895  4/24  Germany.

DONLEY J. STOCKING, *Primary Examiner.*